United States Patent [19]
Luck

[11] Patent Number: 5,321,405
[45] Date of Patent: Jun. 14, 1994

[54] RADIO FREQUENCY ENERGY JAMMING SYSTEM

[75] Inventor: Arthur J. Luck, Santa Barbara, Calif.

[73] Assignee: Raytheon Company, Lexington, Mass.

[21] Appl. No.: 90,777

[22] Filed: Nov. 2, 1997

[51] Int. Cl.⁵ .................................................. H04K 3/00
[52] U.S. Cl. ..................................... 342/15; 342/200; 455/1
[58] Field of Search ............... 455/1, 19, 24, 78, 79, 455/82, 83, 126; 343/18 E; 342/14, 15, 89, 200, 201, 204

[56] References Cited

U.S. PATENT DOCUMENTS

| | | | |
|---|---|---|---|
| 2,427,523 | 9/1947 | Dolberg et al. | 455/82 |
| 2,903,693 | 9/1959 | Ley | 455/78 |
| 2,939,139 | 5/1960 | Handler | 455/78 |
| 3,696,429 | 10/1972 | Tressa | 455/24 |
| 4,087,636 | 5/1978 | Akiyama et al. | 455/79 |
| 4,119,800 | 10/1978 | Girardi | 455/79 |
| 4,214,208 | 7/1980 | O'Donnell | 455/1 |

Primary Examiner—John B. Sotomayor
Attorney, Agent, or Firm—William R. Clark; Richard M. Sharkansky

[57] ABSTRACT

A transmitter/receiver system is provided wherein a transmitter of such system produces a transmitted signal frequency modulated in accordance with the level of a modulating signal and a receiving antenna has an output thereof coupled to a receiver through a switch means, for coupling or inhibiting signals received by the receiving antenna from passing to the receiver selectively in accordance with the level of the modulating signal.

4 Claims, 2 Drawing Sheets

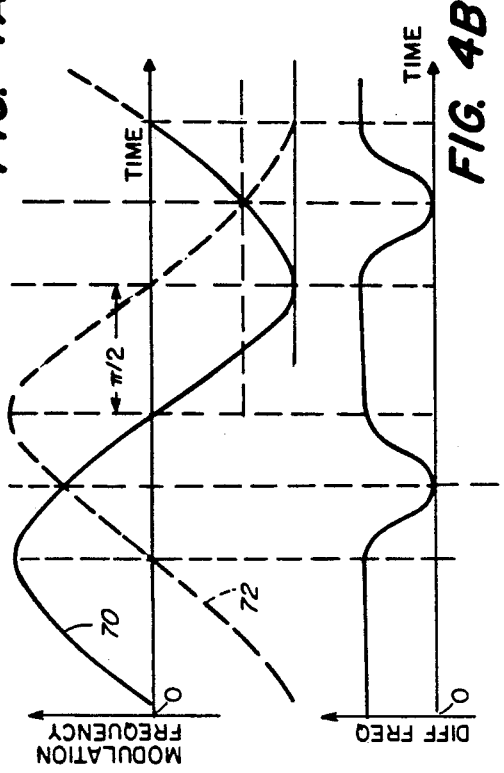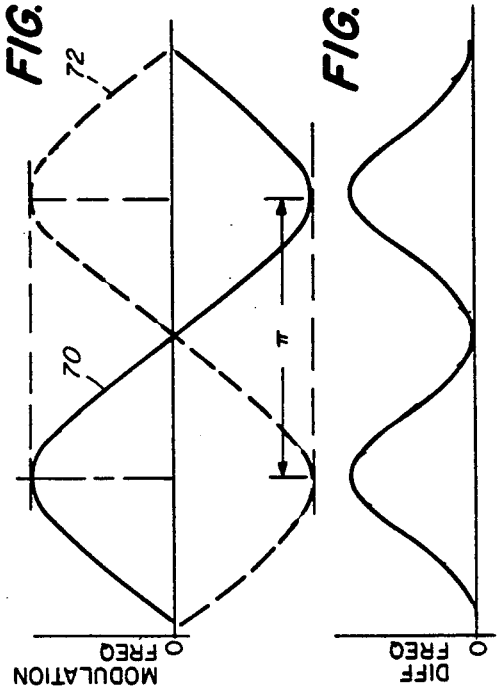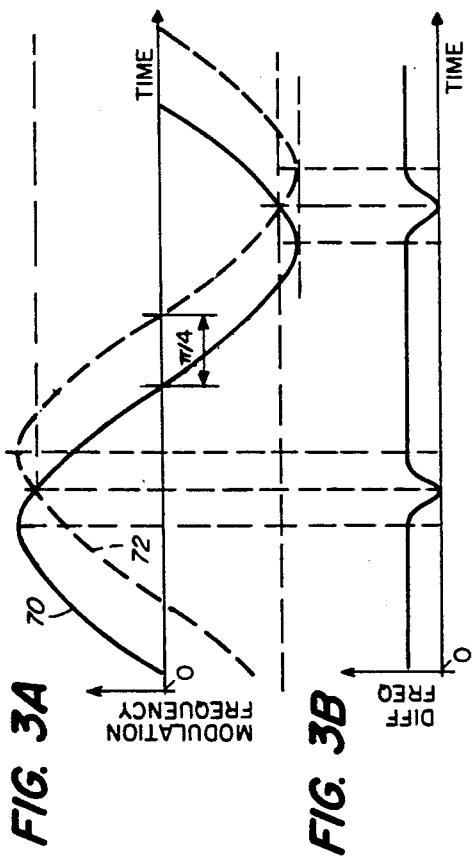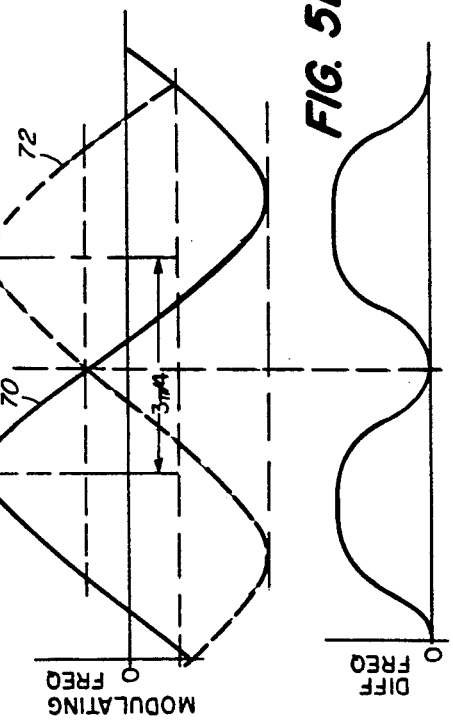

RADIO FREQUENCY ENERGY JAMMING SYSTEM

BACKGROUND OF THE INVENTION

This invention relates generally to radio frequency energy jamming systems and more particularly to jamming systems which include a receiver to determine the frequency of a signal to be jammed.

As is known in the art, a so-called "spot-jammer" generally includes a radar receiver to determine the frequency of a radar signal to be jammed so that a jamming signal made up of a continuous wave (cw) carrier frequency centered at the frequency of the received radar signal and frequency modulated by a band-width limited noise waveform may be directed toward the source of the radar signal. This type of modulation is used because it generally makes most efficient use of the available power amplifier capabilities.

Since the transmitted jamming signal is generally much stronger than the received signal, the frequency of which must be determined to establish the center carrier frequency of the jamming signal, some provision is generally necessary to suppress or "look through" the jamming signal. One obvious way to do this is to interrupt the jamming signal periodically, and during the periods of interruption determine the frequency of the received radar signal. This technique, however, would degrade, significantly, the jamming effectiveness. It would be more desirable to be able to "look through" the jamming signal without interruption to the jamming signal transmission.

One technique used to "look through" the jamming signal includes separate antennas, one for the jamming transmitter and one for the radar signal receiver. The antennas are arranged so that the level of the jamming signal arriving at the receiving antenna is minimized. Such system includes a dual-channel superheterodyne receiver having a pair of mixers which use a portion of the jamming output as their local oscillator signal. Each one of the pair of mixers has an output coupled to a narrow band filter tuned to a suitable intermediate frequency. The outputs of the narrow band filters are fed to an automatic frequency control circuit (AFC) which produces a control signal to change the center carrier frequency of the jamming signal. After the system is locked to the frequency of the received signal by sweeping the control signal one of such filters produces a control signal when the jamming signal frequency is sufficiently higher than the frequency of the received signal, and the other one of such filters produces a control signal when the received signal frequency is sufficiently higher than the frequency of the jamming signal to track the frequency of the received signal. A source of band-limited noise is used to frequency modulate the carrier frequency of the jammer. Since isolation between the jamming transmitter antenna and the receiving antenna is not perfect, there will occur some leakage of the jamming signal into the receiver. This leakage signal will degrade the sensitivity of the receiver. That is, if at any small increment in time the frequency of the portion of the jamming signal were sufficiently different from that of the leakage jamming signal also fed to such mixers, a difference or beat frequency signal would be produced which would pass through one of the pair of filters and thereby cause the AFC to produce a control signal which would incorrectly change the center carrier frequency of the jamming signal. In order to provide some degree of compensation from leakage between the transmitter antenna and the receiving antenna, the portion of the jamming signal coupled to the pair of mixers passes through a delay line. This delay line is selected to match the delay of the leakage jamming signal and thereby cancel its effect on producing an erroneous control signal.

While the use of such a delay line provides some degree of cancellation of the leakage jamming signal, complete cancellation is not achieved because the external leakage path is diffuse. Consequently, receiver sensitivity is still degraded by any residual, uncancelled, leakage jamming signal.

SUMMARY OF THE INVENTION

In accordance with the present invention, a transmitter/receiver system is provided wherein a transmitter of such system produces a transmitted signal frequency modulated in accordance with the level of a modulating signal and a receiving antenna has an output thereof coupled to a receiver through a switch means for coupling or inhibiting signals received by the receiving antenna from passing to the receiver selectively in accordance with the level of the modulating signal.

In a preferred embodiment of the invention the transmitter includes means for producing a center carrier frequency signal frequency modulated by a source of noise signal, the degree of deviation of the transmitted signal from the center carrier frequency being related to the level of the modulating signal. The receiver includes means for producing a control signal related to the difference between the frequency of a received signal and the frequency of the transmitted signal, such control signal driving the center carrier frequency of the transmitted signal to a frequency related, preferably equal to, the frequency of the received signal. The control signal producing means includes a pair of mixers fed by signals passed by the switch means and by a portion of the transmitted signal. The portion of the transmitted signal fed to the mixer passes through a delay line, the delay provided by such line being substantially electrically equal to the delay of leakage jamming signals coupling to the mixers from a transmitter antenna and through the receiver antenna. The beat frequency signals produced by the pair of means are fed to a corresponding pair of bandpass filters having center frequencies at a predetermined intermediate frequency. When the frequency of the received signal is greater than the frequency of the jamming signal coupled to the mixers, and if the beat frequency signal produced by the mixers as produced is within the pass band of the filters, such beat frequency signal passes through a first one of such pair of filters. Conversely, if the frequency of the received signal is less than the frequency of the jamming signal coupled to the mixers and if the beat frequency signal produced by the mixer is within the pass band of the filters, such beat frequency signal passes through the second one of the pair of filters. The outputs of the pair of filters are fed to an automatic frequency control circuit which produces the control signal.

The switch means inhibits the signals received by the receiving antenna, i.e. both signals received from the radar source to be jammed and leakage jamming signals from the transmitter antenna, from passing to the mixers when the level of the modulating signal is relatively small, i.e., when the deviation of the jamming signal from the center carrier frequency of the transmitted signal is relatively small, and such switch means allows the signals received by the receiving antenna to pass to the mixer when the level of the modulating signal is relatively large, or near its maxima (i.e. when the deviation of the jamming signal from the center carrier frequency of the transmitted signal is relatively large, or near its maxima). With such arrangement the effect of uncancelled jamming signal leakage, is decreased because: (1) For small differences in electrical length between the path followed by the jamming signal leakage and the path followed by the portion of the jamming signal to the mixers the smallest difference in the frequencies of the signals passing to the mixers through such paths, and hence the smallest beat frequency signal produced by the mixers, occurs near the maximum deviation of the jamming signal frequency from the center carrier frequency (i.e. when the level of the modulation signal is near its maxima), and hence such relatively low beat frequency signal will not pass through either one of the bandpass filters to the control signal means with the result that the center frequency of the jamming signal will not change as a result of any such uncancelled jammer leakage because the switch means will inhibit the effect of such uncancelled leakage from passing as a beat frequency signal through such filters; and (2), because the only time a beat frequency signal is produced as a result of the mixing of the signal from the radar source to be jammed with the portion of the jamming signal fed to such mixers which will pass through either one of the filters is when the frequencies of such signals differ by an amount such that their beat frequency is within the pass band of the filters and since the operation of the control circuitry is to align the frequency of the radar signal source with the center frequency of the jamming signal a proper beat frequency signal will only be produced when the frequency modulating signal produces a deviation of the frequency of the jamming signal from its center carrier frequency of sufficient magnitude to produce a beat frequency signal neat the intermediate center frequency; however, such deviation only occurs when the jamming signal frequency is near its maximum deviation from the center carrier frequency (i.e. when the level of the modulating signal is near its maxima).

BRIEF DESCRIPTION OF THE DRAWINGS

The foregoing features of this invention, as well as the invention itself, may be more fully understood from the following detailed description read together with the accompanying drawings, in which:

FIGS. 3A, 3B, 4A, 4B, 5A, 5B and 6A, 6B are diagrams useful in understanding the operation of the jamming system of FIG. 1.

DESCRIPTION OF THE PREFERRED EMBODIMENTS

Figure 1:
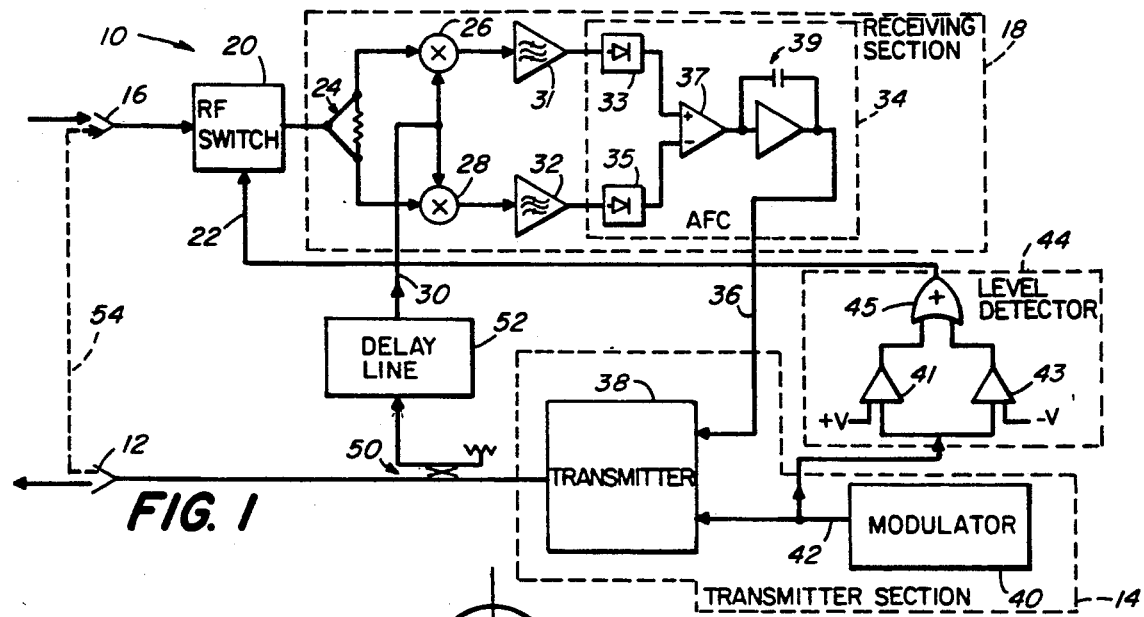
FIG. 1 is a block diagram of a jamming system according to the invention.

Referring now to FIG. 1, a radio frequency signal receiver/transmitter system 10 is shown to include a transmitting antenna 12 coupled to a transmitter section 14 and a receiving antenna 16 coupled to a receiving section 18 through a radio frequency switch 20. The receiving and transmitting antennas 12, 16 may be of any conventional design adapted to receive and transmit, respectively, signals over a wide bandwidth, here several GHz. The radio frequency switch 20 may be of any conventional design, as, for example, a p-i-n diode switch, which is adapted to couple radio frequency signals received by the receiving antenna 16 to the receiver section 18 when a control signal fed to such switch 20 via line 22 is here "high" and to inhibit such received radio frequency signals from passing to receiver section 18 when the control signal on line 22 is here "low".

Receiver section 18 includes a power divider 24 having an input coupled to the output of switch 20, as shown, and a pair of outputs coupled to a pair of mixers 26, 28, as shown. Also fed to such mixers 26, 28 is a local oscillator signal on line 30. The generation of the local oscillator signal will be described hereinafter. Suffice it to say here, however, that, for reasons to become apparent, the frequency of such signal, $f_j$, will be related to the frequency of a jamming signal produced by the transmitter section 14. Mixers 26, 28 are here image rejection mixers, such as are manufactured by RHG Laboratories, Deer Park, N.Y. 11729, mixer 26 producing, inter alia, a beat frequency signal having a frequency equal to the difference between the frequencies of the signals fed to it when the frequency of the signal fed to it from switch 20 is greater than the frequency of the local oscillator signal on line 30 and mixer 28 producing, inter alia, a beat frequency signal having a frequency equal to the difference between the frequencies of the signals fed to it when the frequency of the signal fed to it from switch 20 is less than the frequency of the local oscillator signal on line 30. The outputs of the mixers 26, 28 are fed to a pair of bandpass filters 31, 32, respectively, as shown. Such filters 31, 32 have a center frequency at a predetermined intermediate frequency, here 7.5 MHz, with a bandwidth of such filters 31, 32 being selected as a compromise between providing a wide acceptance window and excluding low frequency noise, as will become apparent hereinafter. Suffice it to say here, however, that the outputs of filters 31, 32 are fed to an automatic frequency control circuit (AFC) 34. In particular, the outputs of filters 31, 32 are fed to a pair of detectors 33, 35, as shown. The outputs of such detectors 33, 35 are fed to a differential amplifier 37. The output of differential amplifier 37 is fed to an integrator 39, here a phantastron, which, in the absence of a voltage fed it from the differential amplifier, produces a sawtooth waveform during the search mode (i.e. the mode when the system searches to lock onto the frequency of the received signal). The output of the integrator 39 produces an output, or control, signal on line 36 to tune the center frequency of transmitter 38 of transmitter section 14.

Transmitter 38 is of any convention design, here a backward wave oscillator. Also fed to transmitter 38 is a modulator 40, as shown. Such modulator 40 is of any conventional design, here a random noise generator which produces a band-limited Gaussian noise waveform having a maximum standard deviation $\sigma$, of several MHz. The noise has a mean value of here, zero volts. The modulator 40 produces a modulating voltage on line 42. Line 42 is fed to transmitter 38 and to a level detector 44, here a pair of comparator circuits 41, 43, the outputs of which are fed to an OR gate 45. The modulator voltage fed to transmitter 38 on line 42 is used to change, or modulate, the frequency of the signal produced by such transmitter 38. The bandwidth of the tracking loop made up of the AFC 34 and transmitter 38 is significantly smaller than the bandwidth of the modulating signal. The control signal on line 36 controls the center carrier frequency of the jamming signal produced by transmitter 38 and the modulating signal on line 42 changes or deviates the frequency of the jamming signal from the center carrier frequency in accordance with the voltage level of the modulating signal. That is, the amount of frequency deviation of the jamming signal produced by transmitter 38 is here directly proportional to the magnitude of the modulating signal on line 42. The polarity of the frequency deviation is here directly related to the polarity of the modulation signal in line 42. The probability density of the frequency of the transmitted signal is shown in curve 45 in FIG. 2. Prior to detection of a received signal the integrator produces a sawtooth output voltage, as noted above, until a received signal is acquired and the system then locks onto the frequency of such received signal. The tracking loop then operates in the tracking mode. The level detector 44 produces a "high" signal on line 22 to activate, or close, switch 20 when the level of the voltage produced by modulator 40 on line 42 is greater than a predetermined level $+V$ or a predetermined level $-V$ and to deactivate, or open, switch 20 when the level of the modulating voltage on line 42 is between $+V$ and $-V$ volts. It follows then that switch 20 couples radio frequency signals received by receiving antenna 16 to receiving section 18 when the magnitude of the modulating voltage on line 42 is greater than V volts and inhibits such received radio frequency signals from passing to such receiver section 18 when the magnitude of the modulating voltage on line 42 is less than V volts.

Completing the system 10, the major portion of the output of transmitting section 12, i.e. the jamming signal, is coupled to the transmitting antenna 12 and a minor portion of such jamming signal is coupled to mixers 26, 28 through a directional coupler 50 and a delay line 52, as shown, to provide the local oscillator signals for such mixers. The delay line 52 length is selected so that the delay of the portion of the jamming signal fed to the mixers 26, 28 via delay line 52 is equal to the delay of jamming signal leakage passing from the directional coupler 50, through transmitting antenna 14, through a direct path 54 between such antenna 14 and receiving antenna 18, through switch 20 to mixers 26, 28. In this way the frequency of the local oscillator signal at the mixers 26, 28 via line 30 will be approximately the same as the frequency of the leakage portion of the jamming signal passing through the direct path 54 with the result that, as to such signals, a beat frequency signal of approximately zero frequency will be produced at the outputs of mixers 26, 28, which beat frequency signal will be rejected by filters 31, 32 and thereby not contribute to the activation of the AFC 34 in producing a control signal for transmitter 38 on line 36.

Figure 2:
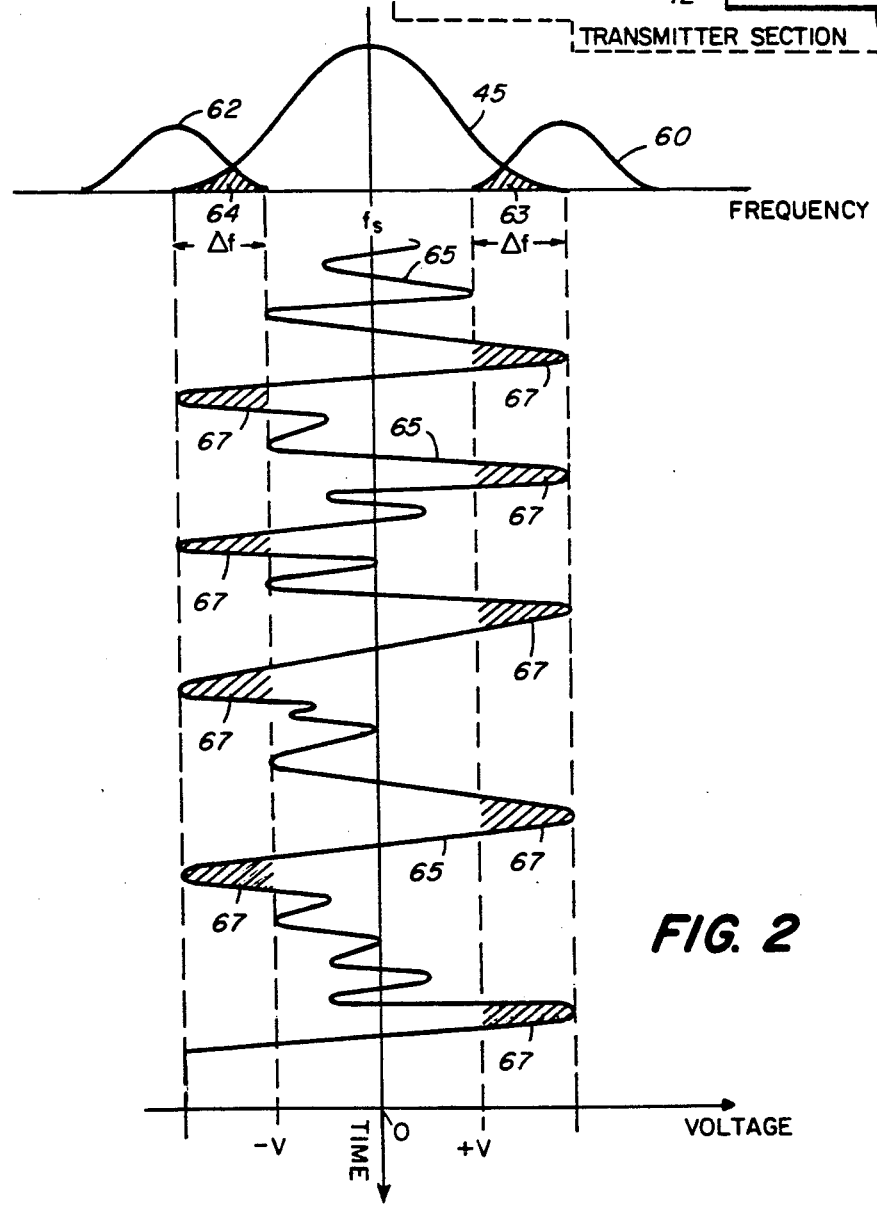
FIG. 2 is a diagram useful in understanding the operation of the jamming system of FIG. 1.

Referring again to FIG. 2, as noted above, the probability distribution of the jamming frequency of the transmitted, or jamming, signal is shown by curve 45. If it is assumed, for purposes of explanation, that all leakage jamming signals are cancelled at mixers 26, 28 and that the radio frequency switch is closed in the steady state, the center carrier frequency of the jamming signal will be the same as the frequency $f_s$ of a received radar signal to be jammed. This is because whenever the jamming signal frequency and received signal frequency differ in frequency sufficiently to produce a beat frequency which passes through one of the bandpass filters 31, 32, a control signal is produced on line 36 to alter the center carrier frequency of the transmitter 38 and to reduce the frequency of the beat frequency signal so that such signal is rejected by the filters 31, 32. Therefore, the control signal on line 36 tunes the jammer transmitter 38 so that the frequency spectrum of the transmitted signal is accurately centered on the frequency $f_s$ of the radar signal source to be jammed as shown in FIG. 2. In such FIG. 2 curves 60, 62 represent the relative magnitude of signals which may pass through bandpass filters 31, 32, (i.e., the pass band of filters 31, 32) respectively and regions 63, 64 represent the band of beat frequency signals which may pass through filters 31, 32, respectively. Also shown in FIG. 2 is a time history of the beat frequency signal 65 produced by the mixing of the modulated jammer signal and the received signal as a result of the modulation of the transmitter by the signal introduced on line 42 (FIG. 1). It is noted that since here the voltage level of the modulating signal on line 42 is directly proportional to the deviation of the jamming frequency from its center frequency, the voltage level time history of the modulating signal on line 42 may be plotted along a common axis with the frequency axis in FIG. 2. That is, the signal 65 in FIG. 2 is also a time history of the modulating voltage on line 42. It is noted in FIG. 2 that the only times when the beat frequency signal produced by mixers 26, 28, as a result of mixing the signals from the radar source to be jammed and the portion of the jamming signal fed to such mixers 26, 28 via delay line 52, passes through filters 31, 32, i.e., are in regions 63, 64 (FIG. 2), is when the level of the modulator signal is greater than V volts, where V volts corresponds to the voltage which deviates the jamming signal frequency from the center carrier frequency of the jamming signal sufficiently so that it beats with the received signal to produce a beat frequency with the pass bands of the filters 31, 32, as indicated. That is, during lock on, if a beat frequency signal is in one of the regions 63, 64 when the level of the modulating signal is less than V, such beat frequency signal would be produced by uncompensated leakage jamming signals. Consequently, switch 20 is activated or closed only during the time periods 67 when the level of the modulating signal on line 42 is greater than V volts to prevent uncompensated leakage jamming signals from producing beat frequency signals which may pass through filters 31, 32 (which would only occur when the level of the modulating signal is less than V volts).

It is also to be noted that switch 20 is activated only during periods of time when the modulating signal on line 42 is near its maximum because during these periods of time the difference in frequency between the local oscillator signal on line 30 at mixers 26, 28 and the frequency of uncompensated leakage jamming signals at such mixers 26, 28 is relatively small and below the pass band of the filters 31, 32. This may be shown by referring to FIGS. 3A, 3B, 4A, 4B, 5A, 5B and 6A, 6B. FIG. 3A shows the frequency history of the portion of the jamming signal fed to mixers 26, 28 (i.e. the local oscillator signal) represented, for purposes of analysis, as a sinusoidal waveform 70 and that of the uncompensated leakage jamming signal 72 at mixers 26, 28 as the local oscillator signal delayed by $\pi/4$ radians. of the modulating frequency. FIG. 3B shows the frequency of the beat frequency signal produced as a result of passing these two signals 70, 72 through mixers 26, 28. FIG. 4A shows the effect of a delay of $\pi/2$ radians between signals 70 and 72 and FIG. 4B shows the frequency of the beat frequency signal produced by mixing these two signals. FIG. 5A shows the effect of a delay of $3\pi/4$ radians between signals 70 and 72 and FIG. 5B shows the frequency of the beat frequency signal produced by mixing these signals. Finally, FIG. 6A shows the effect of a delay of $\pi$ radians between signals 70 and 72 and FIG. 6B shows the frequency of the beat frequency signal produced by mixing such signals. It is noted that for small delay, near $\pi/4$ radians of the modulation frequency, the frequency of the beat frequency signal is minimum when the modulating signal is near its maximum, whereas the frequency of the beat frequency signal is largest in the vicinity of the modulating signal crossing zero. Therefore, since the only times when the frequency of the beat frequency signal may pass through the filters 31, 32 (FIG. 1) is when it is sufficiently high and since this will occur when the modulating signal crosses or is in the vicinity of zero (i.e. has a level less than V volts) and because the switch 20 (FIG. 1) is deactivated or opened during these periods of time then the interference due to uncompensated leakage will be minimized to mixers 26, 28 when the delay mismatches are made, less than $\pi/2$ radians, as is the general case.

The level of the modulation voltage waveform at which the RF switch 20 is activated, i.e. the voltage V, must be selected to maximize the difference between the desired signal (beat frequency of the received signal and the local oscillator signal) and the undesired signal (beat frequency between the jamming leakage signal and the local oscillator signal). This voltage level selected in accordance with: The center frequency and pass band of the filters 31, 32; the amount of delay mismatch between the jammer leakage signal and the local oscillator signal; and the frequencies contained in the modulating signal.

Having described a preferred embodiment of the invention, it is now evident that other embodiments incorporating these concepts may be used. It is felt, therefore, that this invention should not be restricted to the disclosed embodiment, but rather should be limited only by the spirit and scope of the appended claims.

What is claimed is:

1. In combination:
    (a) transmitter means for transmitting a radio frequency signal having a frequency adjusted in accordance with a control signal and frequency modulated in accordance with a frequency modulating signal;
    (b) a receiving antenna for receiving radio frequency signals;
    (c) switch means, responsive to the frequency modulating signal, for coupling or decoupling radio frequency signals received by the receiving antenna to an output selectively in accordance with the frequency modulating signal; and
    (d) means, coupled to the output of the switch means and fed by a portion of the transmitted radio frequency signal, for producing the control signal in accordance with the difference between the frequency of the received radio frequency signals and the frequency of the transmitted radio frequency signal.

2. The combination recited in claim 1 wherein the transmitter means includes a modulator for producing the frequency modulating signal, the frequency of the transmitted radio frequency signal being modulated directly in accordance with the level of the modulating signal and wherein the switch means includes a level detector means for producing a switching signal for the switch means in accordance with the level of the modulating signal.

3. The combination recited in claim 2 wherein the level detector produces a switching signal to enable the switch means to couple received signals to the output when the magnitude of the level of the modulating signal is greater than a predetermined level and to inhibit the switch means from coupling the received signals to the output when the magnitude of the level of the modulating signal is less than the predetermined level.

4. The combination recited in claim 3 wherein the producing means comprises:
    (a) mixer means, coupled to the output of the switch means and fed by the portion of the transmitted radio frequency signal, for producing beat frequency signals related to the difference in frequency between the frequency of the signals coupled to the output and the frequency of the portion of the transmitted radio frequency signal; and
    (b) means, responsive to the beat frequency signal, for producing the control signal.

* * * * *

UNITED STATES PATENT AND TRADEMARK OFFICE
CERTIFICATE OF CORRECTION

PATENT NO. : 5,321,405
DATED : June 14, 1994
INVENTOR(S) : Arthur J. Luck

It is certified that error appears in the above-identified patent and that said Letters Patent is hereby corrected as shown below:

On the cover page, item [22] should appear as follows:

Filed: Nov. 2, 1979

Signed and Sealed this

Thirtieth Day of August, 1994

Attest:

BRUCE LEHMAN

Attesting Officer

Commissioner of Patents and Trademarks